UNITED STATES PATENT OFFICE.

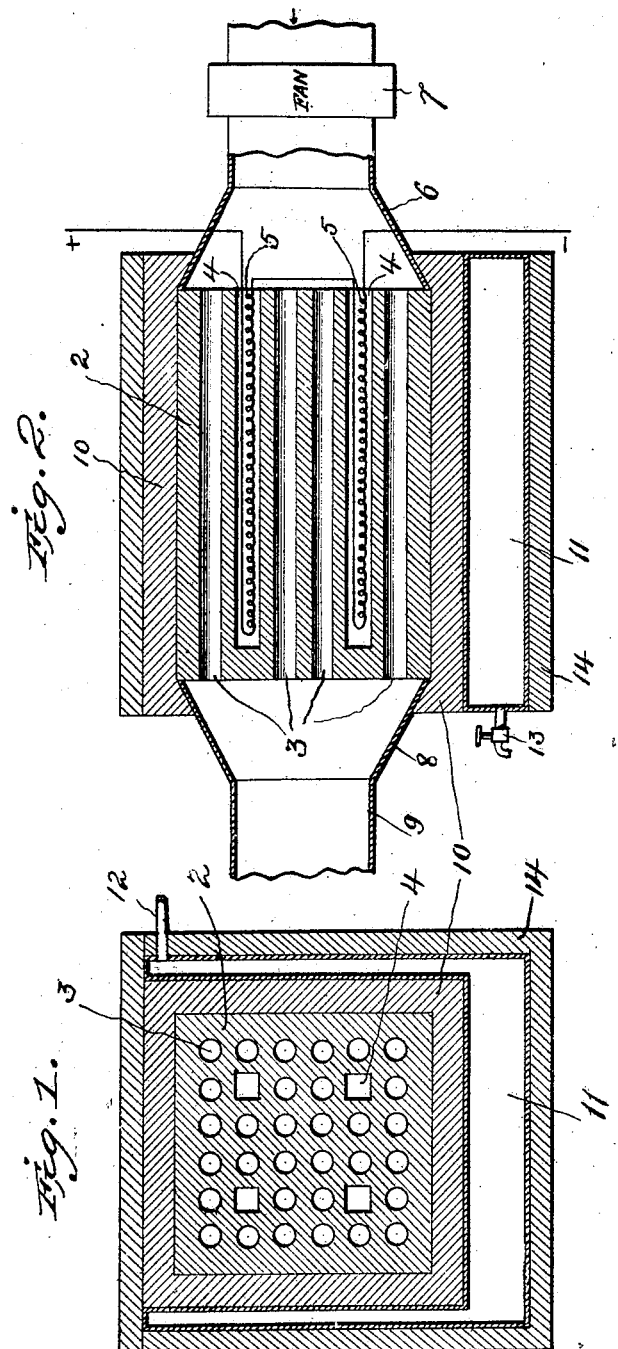

JAMES LAWRENCE, OF NEW YORK, N. Y., ASSIGNOR TO ELECTRIC HEAT STORAGE COMPANY, A CORPORATION OF NEW YORK.

AIR-HEATER.

1,052,834.  Specification of Letters Patent.  Patented Feb. 11, 1913.

Application filed December 16, 1909. Serial No. 533,411.

*To all whom it may concern:*

Be it known that I, JAMES LAWRENCE, a subject of the King of Great Britain, residing at New York city, county and State of New York, United States of America, have invented certain new and useful Improvements in Air-Heaters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to heaters and has for its object to provide a simple and efficient heater adapted to heat incoming fresh air for heating and ventilating rooms, houses and other places.

It comprises a heat accumulator provided with a plurality of air passages and with one or more electrical heating units. This accumulator is preferably heat insulated or jacketed and has in connection therewith certain details of construction hereinafter more particularly described and claimed.

Referring to the drawings, in which like parts are similarly designated, Figure 1 is a transverse section through the device and Fig. 2 is a vertical longitudinal section thereof.

The heater comprises a heat accumulator 2 provided with a plurality of air passages 3 extending through it from end to end. Within the accumulator are one or more recesses 4 for the reception of electrical heating elements 5. These heating elements may be of any suitable construction, it being sufficient that the elements are adapted to be removably inserted in the recesses 4 and are capable of heating the accumulator 2, which is preferably a metallic block. The metal I prefer to use is iron; however, other metals may be used to advantage. This iron block or accumulator 2 has at one end, the air entrance end, a casing 6 extending to a fan 7. The fan being suitably driven in any desired manner drives the cool or cold air through the passages 3 in the heated iron block 2 and then enters a casing 8 from which the hot air is conducted by pipe 9 to suitable registers or the like. The iron block or accumulator is provided with a heat insulating covering 10 and outside of this covering is a closed trough-like tank 11 for the reception of water which is taken in at pipe 12 and can be drawn off from the faucet or tap 13 or it may be that a water distributer or service pipe may be connected where the tap or faucet 13 is placed. The entire device is surrounded by an insulating covering 14.

The operation is no doubt obvious. Current passing through the heating elements will cause them to heat the iron or other metallic block 2 and maintained it heated. While the fan 7 draws cool or cold air from outside and forces it through the passages 3 and to the air distributer pipe 9. Any heat escaping through the insulation 10 will be absorbed by the water in the tank 11 and this water may be utilized for domestic purposes.

I claim:—

1. The combination with a heat accumulator or mass capable of storing a large quantity of heat and having a multiplicity of passages or ducts therethrough; of means to electrically heat the accumulator, and means to induce a current of air through the ducts in the accumulator.

2. A heat accumulator or mass of metal capable of storing a large quantity of heat and having a multiplicity of passages or ducts therethrough, said ducts arranged in the accumulator to abstract heat from all parts of the mass, means to electrically heat the accumulator and means to induce a current of air through the passages or ducts.

3. In combination, a rectangular metallic block having a plurality of heating passages therethrough and a plurality of electric heating elements removably contained in said block, a fan, a casing between the fan and one end of the accumulator, and a delivery pipe at the other end of the accumulator.

4. In combination, a heat accumulator having a plurality of air heating passages therethrough, means to heat the accumulator, means to force air through said passages, a heat insulating covering for the accumulator and a water heating chamber external of said covering.

5. In combination, a heat accumulator, a mass of metal capable of storing a large quantity of heat and having a multiplicity of passages or ducts therethrough distributed throughout the accumulator and extending from end to end thereof, an insulating covering for the accumulator, means to electrically heat the accumulator, a water heating chamber external of the accumulator, and means to induce a current of air through the passages in the accumulator, whereby heat is abstracted by the air from all parts of the accumulator.

In testimony that I claim the foregoing as my invention, I have signed my name in presence of two subscribing witnesses.

JAMES LAWRENCE.

Witnesses:
G. J. LOTHIAN NICHOLSON,
LAURA E. SMITH.